United States Patent
Fujimoto et al.

(10) Patent No.: US 8,200,755 B2
(45) Date of Patent: Jun. 12, 2012

(54) PRESENCE ADMINISTRATION METHOD AND DEVICE

(75) Inventors: Shingo Fujimoto, Kawasaki (JP); Takashi Ohno, Kawasaki (JP); Yuki Yamamoto, Kawasaki (JP); Jun Kakuta, Kawasaki (JP); Satoshi Okuyama, Kawasaki (JP); Akinori Iwakawa, Kawasaki (JP); Sumiyo Okada, Kawasaki (JP); Masahiko Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 781 days.

(21) Appl. No.: 10/464,634

(22) Filed: Jun. 19, 2003

(65) Prior Publication Data

US 2004/0003037 A1 Jan. 1, 2004

(30) Foreign Application Priority Data

Jun. 27, 2002 (JP) ................................. 2002-187374

(51) Int. Cl.
*G06F 15/16* (2006.01)
(52) U.S. Cl. ........................................ 709/204; 709/227
(58) Field of Classification Search .................. 709/202, 709/206, 227, 228, 242; 455/3.04, 3.05, 455/416; 726/8
See application file for complete search history.

(56) References Cited

U.S. PATENT DOCUMENTS

| | | | |
|---|---|---|---|
| 5,493,692 A * | 2/1996 | Theimer et al. | 455/26.1 |
| 5,727,203 A * | 3/1998 | Hapner et al. | 707/103 R |
| 6,677,968 B1 * | 1/2004 | Appelman | 715/853 |
| 6,750,881 B1 * | 6/2004 | Appelman | 715/733 |
| 6,993,327 B2 * | 1/2006 | Mathis | 455/414.1 |
| 7,035,942 B2 * | 4/2006 | Daniell et al. | 709/246 |
| 7,076,546 B1 * | 7/2006 | Bates et al. | 709/224 |
| 7,310,532 B2 * | 12/2007 | Knauerhase et al. | 455/456.1 |
| 2002/0035605 A1 * | 3/2002 | McDowell et al. | 709/206 |
| 2002/0049610 A1 * | 4/2002 | Gropper | 705/1 |
| 2002/0063735 A1 * | 5/2002 | Tamir et al. | 345/745 |
| 2002/0065718 A1 | 5/2002 | Otani et al. | |
| 2002/0083127 A1 * | 6/2002 | Agrawal | 709/203 |
| 2002/0194003 A1 * | 12/2002 | Mozer | 704/270.1 |
| 2003/0028597 A1 * | 2/2003 | Salmi et al. | 709/204 |

(Continued)

FOREIGN PATENT DOCUMENTS

JP 2001-14254 1/2001

(Continued)

OTHER PUBLICATIONS

Japanese Patent Office Action, dated Apr. 25, 2006.

(Continued)

*Primary Examiner* — Patrice Winder
*Assistant Examiner* — Tauqir Hussain
(74) *Attorney, Agent, or Firm* — Staas & Halsey LLP

(57) ABSTRACT

In a presence system in which one user users a plurality of terminals, dynamically changing buddy lists are synchronized between the terminals. A presence notification message is sent to all the terminals of the user. The timing of sending includes, for example, when the presence information of a buddy is updated, when a new buddy is set, when display attribute information is updated, when a buddy is cancelled, and when a presence notification of unknown presentity is made. Thus, when one user uses a plurality of terminals in the presence system, dynamically changing buddy lists can be synchronized between the terminals. In addition, the display formats of the buddy lists do not differ from one terminal to another, and the same display format is attained.

18 Claims, 14 Drawing Sheets

U.S. PATENT DOCUMENTS

| | | | |
|---|---|---|---|
| 2003/0037103 A1* | 2/2003 | Salmi et al. | 709/203 |
| 2003/0101343 A1* | 5/2003 | Eaton et al. | 713/170 |
| 2003/0104819 A1* | 6/2003 | Knauerhase et al. | 455/456 |
| 2003/0105805 A1* | 6/2003 | Jorgenson | 709/203 |
| 2003/0217099 A1* | 11/2003 | Bobde et al. | 709/202 |
| 2003/0217142 A1* | 11/2003 | Bobde et al. | 709/224 |
| 2004/0093387 A1* | 5/2004 | Wick | 709/207 |
| 2005/0188318 A1* | 8/2005 | Tamir et al. | 715/744 |
| 2005/0251448 A1* | 11/2005 | Gropper | 705/14 |
| 2006/0023246 A1* | 2/2006 | Vidyanand | 358/1.13 |
| 2006/0112150 A1* | 5/2006 | Brown et al. | 707/201 |
| 2006/0190525 A1* | 8/2006 | Bobde et al. | 709/202 |
| 2006/0190591 A1* | 8/2006 | Bobde et al. | 709/224 |
| 2006/0262909 A9* | 11/2006 | Adamczyk | 379/88.13 |

FOREIGN PATENT DOCUMENTS

| | | |
|---|---|---|
| JP | 2001-249878 | 9/2001 |
| JP | 2002-170032 | 6/2002 |

OTHER PUBLICATIONS

Japanese Patent Office Action, mailed Mar. 27, 2007 and issued in corresponding Japanese Patent Application No. 2002-187374.

* cited by examiner

| buddy list information | | display attribute information | |
|---|---|---|---|
| watcher ID | buddy ID | display name | category |
| User-A@fujitsu.com | shingo@im.jp.fujitsu.com | shingo | company |
| | ohno@im.jp.fujitsu.com | ohno | company |
| | okuyama@im.jp.fujitsu.com | okuyama | company |
| | kakuta@im.jp.fujitsu.com | kakuta | company |
| ⋮ | ⋮ | ⋮ | ⋮ |

*Fig. 4*

| presentity ID | watcher ID |
|---|---|
| shingo@im.jp.fujitsu.com | User-A@fujitsu.com |
| | ohno@im.jp.fujitsu.com |
| | okuyama@im.jp.fujitsu.com |
| | kakuta@im.jp.fujitsu.com |
| | ⋮ |

*Fig. 5*

Buddy list synchronization

Buddy list display screen
(clients $2a_1$, $2a_2$, and $2a_3$)

Buddy setting screen
(client $2a_1$)

Buddy list display screen
(clients $2a_1$, $2a_2$, and $2a_3$)

Synchronization of display attribute information

Buddy list display screen
(clients 2a₁, 2a₂, and 2a₃)

Display attribute information-setting display screen (client 2a₁)

Buddy list display screen
(clients 2a₁, 2a₂, and 2a₃)

Fig. 9A

Reconnect message (type 1) (client → server)

```
LOGON
To: User-A@im.jp.fujitsu.com
```

Fig. 9B

Reconnection message with time stamp (type 2) (client → server)

```
LOGON
To: User-A@im.jp.fujitsu.com
Last-notified: 2002-05-13-13:30:45+9:00
```

Fig. 9C

Presence notification message (server → client)

```
NOTIFY
From: shingo@ im.jp.fujitsu.com
To   : User-A@im.jp.fujitsu.com
X-Display: shingo
X-Group Name: Company
Status : Waiting
```

```
NOTIFY
From: okuyama@ im.jp.fujitsu.com
To   : User-A@im.jp.fujitsu.com
X-Display: okuyama
X-Group Name: Company
Status : Busy
```

⋮

Display screen examples of the buddy list after reconnection (client 2a₁)

immediately after startup receiving receiving completed after presence notification Watching cancellation
Watching cancel message
(server → client)
```
NOTIFY
From: mfukui@im.jp.fujitsu.com
To   : User-A@im.jp.fujitsu.com
Subscription-State: terminated
```
*Fig. 12A*
Buddy list display screen
(clients $2a_1$, $2a_2$, and $2a_3$)
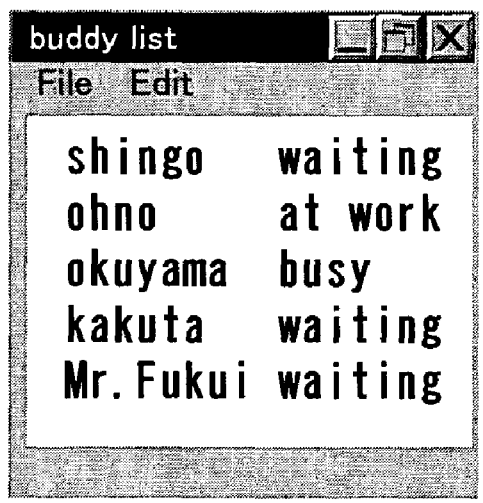
Buddy list display screen
(clients $2a_1$, $2a_2$, and $2a_3$)
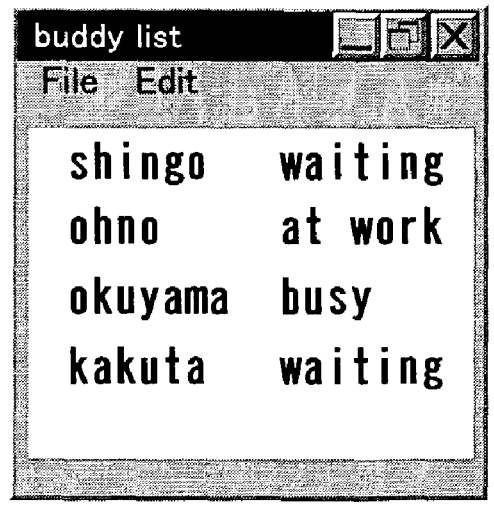
*Fig. 12B*          *Fig. 12C*

Warning message

PRESENCE ADMINISTRATION METHOD AND DEVICE

BACKGROUND OF THE INVENTION

1. Field of the Invention

The present invention relates to presence systems which enables a user on a network to refer to presence information of other users.

In the present invention, a presence system includes a server and clients. The server stores presence information of a user agent who operates a client and distribute the presence information to other clients. The owner of the distributed presence information is referred to as a "presentity". The operator of a client that receives the presence information of the presentity is referred to as a "watcher". Presence information means any information related to the presentity, and may include text messages and icon files that indicate status, personal information that indicates residential addresses or communication addresses, and the like. Another user agent whose presence information that a user agent wishes to subscribe to is referred to as a "buddy" of a user agent. A list of the buddies of a user agent is referred to as a "buddy list".

2. Description of Related Art

In recent years, there has been a rapid spread of communication services that enable users to connect with the Internet all the time from homes and workplaces, and mobile telephones that are connectable to the Internet have also been widely used. As such communication infrastructure has been built up, presence systems, by which a user can reference the presence information of other users on a network, have been more commonly available in people's daily lives and in workplaces. Instant messaging systems (hereafter referred to as "IM systems") have also been widely used, in which users exchange text messages one another in real-time. Among presence systems, there exits a system that handles text messages as part of the presence information; for this reason, the presence system herein is meant to include such IM systems.

In a presence system, a presentity owns presence information. Each presentity can freely set his/her own presence information. A user registers a presentity whom the user has interest in, i.e., a buddy, to a server. The requesting user becomes a watcher of the buddy, and acquires presence information of the buddy.

Recently, it is not uncommon that one user uses a plurality of terminals. In presence systems as well, there exists a system designed for a use such that one user uses a plurality of terminals. For example, Microsoft Messenger (a registered trademark) enables one user to use both a terminal at work and a terminal at home by switching between them. When a user updates a buddy list with a terminal at the workplace, the latest buddy list is uploaded to the server. Thereafter, when a terminal at home is connected to the server, the buddy list in the terminal at home is compared with the buddy list in the server and the latest buddy list is downloaded from the server. Thus, Microsoft Messenger performs synchronization of buddy lists between a plurality of terminals used by one user.

However, in the foregoing presence system, it is not assumed that one user simultaneously uses a plurality of terminals. For this reason, if one user wants to simultaneously connect a plurality of terminals with the server, only one of the terminals can connect with the server at a time, which is inconvenient. Moreover, even if the foregoing presence system allows one user to connect a plurality of terminals, it is only when each of the terminals connects with the server that the buddy list in each terminal obtains the latest status. Thus, a system has not yet been conceived that after a plurality of terminals have connected with a server, a change in the buddy list of a terminal is reflected in the buddy list of another terminal. In other words, it has not yet been possible to provide a system such that a dynamically changing buddy list is synchronized between a plurality of terminals used by one user.

Furthermore, in the foregoing presence system, display formats of the buddy lists displayed on the terminals may differ from one terminal to anther. The display format of a buddy list can be set according to user's preferences by setting display attribute information such as display names and categories of the buddies. However, the display attribute information is only valid in each one of the terminals. Accordingly, if the user wants to display the buddy list in a plurality of terminals in the same format, he/she has to set the display attributes in each of the terminals, which is a cumbersome operation.

In addition, in a presence system, a user may be notified of the presence information of a presentity who is not specified by the user as his/her buddy. This is undesirable for security reasons. Moreover, the user may find offensive if he/she is notified of the presence information of unknown presentity unilaterally.

It is an object of the present invention to allow a presence system in which one user uses a plurality of terminals to synchronize dynamically changing buddy lists between the terminals.

It is another object of the present invention to allow a presence system in which one user uses a plurality of terminals to synchronize display formats of the buddy lists in the terminals without increasing a burden on the user.

It is further another object of the present invention to tighten the security of a presence system and to prevent a presence notification that is a nuisance for the user.

BRIEF SUMMARY OF THE INVENTION

In view of the foregoing and other objects, the present invention provides a presence administration method for use in a presence administration device administrating presence information of a group of users who operate a group of clients, the method comprising: a presence-administrating step of accepting setting of presence information of the users included in the group of users and administrating the presence information; a client-storing step of storing the identifiers of one or more clients operated by each user among the group of users; a watcher-storing step of storing watcher lists that are created for each user and that include one or more identifiers of watchers to whom a user's presence information is distributed; a buddy list-storing step of storing buddy lists that are created for each user and that include one or more identifiers of buddies who are in interest of a user; a buddy list-updating step of accepting updating of the buddy list of a first user included in the group of users from any of the clients operated by the first user, and updating the watcher list stored in the watcher-storing step and the buddy list stored in the buddy list-storing step according to content of the updating; and a buddy list-synchronizing step of judging whether or not a buddy is added in the buddy list-updating step, and if a buddy has been added, transmitting the presence information of the added buddy and the identifier of the buddy to at least one of the clients of the first user is being connected to the presence administration device.

This method is used in a server of the presence system. Assume here that a user agent A operates a plurality of clients c1, c2, and c3, and that the user agent A adds a new buddy B in the buddy list using the client c1. The server notifies the clients c1, c2, and c3 of the presence information of the buddy B and the ID of the buddy B. Thus, the clients c2 and c3 as well as the client c1 recognize that the buddy B is added as a new buddy, and they display the presence information of the buddy B. In this manner, even if a buddy list dynamically changes in a situation where one user operates a plurality of clients, the buddy list of each of the terminals can be synchronized in real-time.

Preferably, in the above-described method, in the buddy list-synchronizing step, using a command for notifying of the presence information, attribute information related to any user contained in the group of users is transmitted to one of the clients of the first user that is being connected with the presence administration device.

An example of the attribute information includes "a notification for aborting distribution of the presence information of a buddy". Another example of attribute information is "a notification that the presence information of a user who is not specified as a buddy has been distributed". Further another example of the attribute information is display attribute information for displaying the presence of a buddy.

Preferably, in the above-described method, the buddy list-storing step stores attribute information related to the buddies contained in the buddy list together with the buddies; the buddy list-updating step further accepts setting of the attribute information related to the buddies contained in the buddy list; and the buddy list-synchronizing step judges whether or not the attribute information of any buddy has been set, and if the attribute information has been set, transmitting, together with the presence information of the buddy, the identifier of the buddy and the attribute information related to the buddy to all the clients operated by the first user.

For example, when a buddy is added, the added buddy and the attribute information thereof are transmitted to the clients of the user agent A using a presence notification command. For example, when the attribute information is display attribute information regarding the display of the buddy list, the buddy list is displayed in the same display format.

It is possible that although the buddy list itself is not updated, the display attribute information of a buddy may be updated in the client c1. In this case, the other clients c2 and c3 of the user agent A are notified of the display attribute information of the buddy using a presence notification command. Thus, the display formats as well as the buddies can be synchronized.

The above-described method may further comprises a first reconnection-detecting step of detecting a reconnection request from any of the clients of the first user, and transmitting the identifiers and the presence information of all the buddies of the first user to the client in response to the reconnection request.

For example, assume that, of the clients c1, c2, and c3 of the user agent A, the client c1 is restarted and then transmits a "LOGON" command to the server. The server transmits the buddy list of the user agent A and the presence information of the buddies to the client c1 using a presence notification command. Thus, the restarted client c1 can display the same buddy list as displayed on the other clients c2 and c3.

Preferably, in the above-described method, the presence-storing step further stores presence information set time in addition to the presence information of the users; and the method further comprises a second reconnection-detecting step of detecting a reconnection request containing the last connected time from any client of the first user, and transmitting, to the client, the identifier and the presence information of a buddy among the buddies of the first user whose presence information has changed after the last connected time.

In this method, the client c1 that attempts reconnection is notified of the presence information of the buddy whose presence information changed during the time in which the connection was disconnected. For example, in cases where the clients and the server communicate with each other using UDP, the client transmits a reconnection request if there has been no communication from the server for 30 minutes or more. The reconnection request contains the time at which the server last communicated with the client. The server transmits, to the clients, the identifier and the presence information of a buddy having presence information that has been set after a specified time using a presence notification command. The load to the server is thus reduced in comparison with the case where the presence information of all the buddies of the user agent that have reconnected is transmitted.

The above-described method may further comprises a log-off storing step of storing log-off time that is the latest time at which one or more clients of each user among the group of users has last been connected to the presence administration device; a distribution canceling step of deleting the identifier of the first user from the watcher list stored in the watcher-storing step when a predetermined time has elapsed since the logoff time of the first user; and a watcher re-storing step of judging whether or not the first user has been deleted from the watcher list when any client of the first user connects with the presence administration device, and if it is judged that the first user has been deleted, rewriting the identifier of first user as the watcher of the first user into the watcher list.

When a user agent A did not connect with the presence administration device for a long time, the user agent A is deleted from the destination watcher list. When the deleted user agent A is reconnected, the server sets again the user agent A as a watcher of the buddies, based on the buddy list of the user agent A. The user agent A can acquire again an update notification of the presence information of the buddies.

Preferably, in the above-described method, the watcher re-storing step performs a confirmation, with each buddy, of whether or not the presence information is permitted to be distributed to the first user, and deletes the identifier of a buddy who does not give the permission from the buddy list of the first user.

There are cases where a user agent B, who was a buddy of the user agent A, does not permit the notification of the presence information to the user agent A since the user agent B can change his/her mind as time elapses. If this is the case, the server deletes the buddy B from the buddy list of the user agent A. As a result, the memory resource of the server can be effectively used.

Preferably, in the above-described method, it is determined whether the identifier of at least one buddy is to be deleted from the buddy list of the first user, and if it is determined to be deleted, at least one of the clients of the first user that is being connected is notified of the identifier of the buddy to be deleted and a delete message that is in place of the presence information of the buddy.

For example, in the foregoing method, there are cases where a buddy is deleted or the presence administration device deletes distribution relationships. In this case, the clients are notified of the identifier of the buddy to be deleted and the delete message by receiving a presence notification command. This is advantageous in that the clients need not wastefully display a buddy whose notification of updates of the presence information is no longer made.

Preferably, in the above-described method, the buddy list-synchronizing step, prior to transmitting the presence information of a second user among the group of users to the clients of the first user, judges whether the identifier of the second user is contained in the buddy list of the first user, and if it is not contained, transmits a warning message in addition to the identifier and the presence information of the second user to at least one of the clients of the first user that is being connected with the presence administration device.

Specifically, there are cases where a user agent X who is not a buddy of the user agent A transmits his/her own presence information to the user agent A. In this case, the server transmits a warning message in addition to the identifier and the presence information of the user agent X, using a presence notification command. The clients can prompt user agent A to confirm whether or not the user agent X is to be added as a buddy, based on the warning message. Alternatively, the clients can ignore the notification of the presence information of the user agent X, based on the warning message. As a consequence, it is possible for the user agent A to prevent the presence information of unknown user agent X from being displayed unilaterally.

The present invention also provides a presence administration device administrating presence information of a group of users who operate a group of clients, comprising: presence-administrating means for accepting setting of presence information of each user among the group of users and administrating the presence information; client-storing means for storing identifiers of one or more clients operated by each user among the group of users; watcher-storing means for storing watcher lists that are created for each user and that include one or more identifiers of watchers to whom a user's presence information is distributed; buddy list-storing means for a storing buddy lists that are created for each user and that include one or more identifiers of buddies who are in interest of a user; buddy list-updating means for accepting updating of the buddy list of a first user included in the group of users from any of the clients operated by the first user, and updating the watcher list stored in the watcher-storing means and the buddy list stored in the buddy list-storing means according to content of the updating; and buddy list-synchronizing means for judging whether or not a buddy is added in the buddy list-updating means, and if a buddy has been added, transmitting the presence information of the added buddy and the identifier of the buddy to at least one of the clients of the first user that is being connected to the presence administration device.

The present invention additionally provides a presence administration computer product for causing a computer to function as: presence-administrating means for accepting setting of presence information of each user among the group of users and administrating the presence information thereof; client-storing means for storing identifiers of one or more clients operated by each user among the group of users; watcher-storing means for storing watcher lists that are created for each user and that include one or more identifiers of watchers to whom a user's presence information is distributed; buddy list-storing means for storing buddy lists that are created for each user and that include one or more identifiers of buddies who are in interest of a user; buddy list-updating means for accepting updating of the buddy list of a first user included in the group of users from any of the clients operated by the first user, and updating the watcher list stored in the watcher-storing means and the buddy list stored in the buddy list-storing means according to content of the updating; and buddy list-synchronizing means for judging whether or not a buddy is added in the buddy list-updating means, and if a buddy has been added, transmitting the presence information of the added buddy and the identifier of the buddy to at least one of the clients of the first user that is being connected to the presence administration device.

The present invention further provides a computer-readable storage medium storing a presence administration program administrating presence information of a group of users who operate a group of clients, the program executing: a presence-administrating step of accepting setting of presence information of each user among the group of users and administrating the presence information thereof; a client-storing step of storing identifiers of one or more clients operated by each user among the group of users; a watcher-storing step of storing watcher lists that are created for each user and that include one or more identifiers of watchers to whom a user's presence information is distributed; a buddy list-storing step of storing buddy lists that are created for each user and that include one or more identifiers of buddies who are in interest of a user; a buddy list-updating step of accepting updating of the buddy list of a first user included in the group of users from any of the clients operated by the first user, and updating the watcher list stored in the watcher-storing step and the buddy list stored in the buddy list-storing step according to content of the updating; and a buddy list-synchronizing step of judging whether or not a buddy is added in the buddy list-updating step, and if a buddy has been added, transmitting the presence information of the added buddy and the identifier of the buddy to at least one of the clients of the first user that is being connected to the presence administration device.

The present invention also provides, in accordance with another aspect, a presence-referencing method used for a first client operated by a user, the method comprising: a connecting step of connecting with a computer that administrates presence information of one or more buddies who are in interest of the user; a buddy list-displaying step of receiving one or more identifiers and the presence information of the buddies from the computer and displaying the presence information of the buddies; a synchronizing step of, subsequent to the buddy list-displaying step, receiving from the computer the presence information and the identifier of a new buddy of the user that has been set from a second client operated by the user; and a buddy list-updating step of displaying the presence information of the new buddy.

In a presence system employing this method, client c2 receives from the server the presence information and the identifier of a new buddy B of the user agent A, which have been set in another client c1. Thereafter, the client c2 displays the presence information of the same buddies as displayed on the client c1.

Preferably, in the above-described method, the synchronizing step receives attribute information related to the buddies in addition to the presence information and one or more identifiers of the buddies; and the buddy list-updating step updates a display related to any of the buddies and/or a display related to the presence information thereof based on the attribute information.

In a presence system employing this method, client c2 receives from the server the presence information, the identifier, and the display attribute information of a new buddy B of the user agent A, which have been set in another client c1. Thereafter, the client c2 displays the presence information of the buddy B according to, for example, the attribute information. As a consequence, the buddy lists in the clients c1 and c2 are synchronized including their display formats.

The above-described method may further comprises a time-storing step of storing last connection time that is the time at which the client has last communicated with the computer; and a buddy list-reacquiring step of, subsequent to the buddy list-displaying step, notifying the computer of the last connection time, and acquiring the identifier and the presence information of at least one of the buddies of the first user whose presence information has changed after the last connection time from the computer.

For example, assume that the server and the clients communicate with each other using UDP. When it is inferred that the connection with the server is disconnected, the clients can acquire the presence of a buddy whose presence information has changed during the disconnection.

The above-described method may further comprises a buddy deleting-step of, subsequent to the buddy list-displaying step, receiving the identifier of a given buddy of the user and a delete message that is in place of the presence information of the one of the buddy from the computer, and erasing the display of the presence information of the buddy.

The clients that received the delete message delete the subject buddy from the buddy list, and it notifies the user agent that the buddy has been deleted.

The above-described method may further comprises a warning-receiving step of receiving, from the computer, the presence information of a second user who is not the buddies of the user, the identifier of the second user, and a warning message.

For example, the clients that have received the warning message related to a user agent B may display a confirmation window for confirming whether or not the user agent B may be added as a buddy. Alternatively, they may ignore the presence notification with the warning message.

The above-described method may further comprises a confirming step of, subsequent to the warning-receiving step, confirming with the first user whether or not the second user is to be added as a buddy.

For example, when a user agent A permits a user agent B to be added as a buddy, the presence information of the user agent B is displayed on the clients of the user agent A. Conversely, if the user agent A does not give a permission, the presence information of the user agent B cannot be displayed on the clients of the user agent A. Consequently, it is possible for the user agent A to prevent the presence information of unknown people from being displayed unilaterally.

The present invention also provides a presence-referencing device serving as a first client operated by a user, comprising: connecting means for connecting with a computer that administrates presence information of one or more buddies who are in interest of the user; buddy list-displaying means for receiving one or more identifiers and the presence information of the buddies from the computer and displaying the presence information of the buddy/buddies; synchronizing means for, subsequent to the buddy list-displaying means, receiving from the computer the presence information and the identifier of a new buddy of the user that has been added by a second client operated by the user; and buddy list-updating means for displaying the presence information of the new buddy.

The present invention additionally provides a presence-referencing computer product for causing a computer that is a first client operated by a user to function as: connecting means for connecting with a computer that administrates presence information of one or more buddies who are in interest of the user; buddy list-displaying means for receiving one or more identifiers and the presence information of the buddies from the computer and displaying the presence information of the buddies; synchronizing means for, subsequent to the buddy list-displaying means, receiving from the computer the presence information and the identifier of a new buddy of the user that has been set by a second client operated by the user; and buddy list-updating means for displaying the presence information of the new buddy.

The present invention further provides a computer-readable storage medium storing a presence-referencing program used in a first client operated by a user, the program executing: a connecting step of connecting with a computer that administrates presence information of one or more buddies who are in interest of the user; a buddy list-displaying step of receiving one or more identifiers and the presence information of the buddies from the computer and displaying the presence information of the buddies; a synchronizing step of, subsequent to the buddy list-displaying step, receiving from the computer the presence information and the identifier of a new buddy of the user that has been set by a second client operated by the user; and a buddy list-updating step of displaying the presence information of the new buddy.

The present invention also provides, in accordance with further another aspect, a presence-referencing method used in a first client operated by a user, the method comprising: a connecting step of connecting with a computer that administrates the presence information of one or more buddies who are in interest of the user; and a buddy list-setting step of accepting specifying of one or more identifiers of the buddies and/or setting of the attribute information related to the buddies, and transmitting the identifiers and the attribute information of the buddies to the computer.

A client c1 of the user agent A transmits to the server attribute information of a new buddy B in addition to the identifier of the buddy B. The attribute information of the buddy B is transmitted to the client c1 using the presence notification.

As described above, according to the present invention, dynamically changing buddy lists can be synchronized between terminals in a presence system in which one user uses a plurality of terminals.

From the following detailed description in conjunction with the accompanying drawings, the foregoing and other objects, features, aspects and advantages of the present invention will become readily apparent to those skilled in the art.

BRIEF DESCRIPTION OF THE DRAWINGS

FIG. 4 is an illustration of a buddy list stored in a server;

FIG. 5 is an illustration of a watcher table stored in a server;

FIG. 9A shows an example of the format of a reconnection message (type 1);

FIG. 9B shows an example of the format of a reconnection message with timestamp (type 2).

FIG. 9C shows presence notification messages according to reconnection messages;

FIG. 12A shows an example of a watching cancel message;

FIG. 12B shows an example of a buddy list screen displayed before the watching cancel message is received;

FIG. 12C shows an example of a buddy list screen displayed after the watching cancel message has been received;

DETAILED DESCRIPTION OF THE PREFERRED EMBODIMENTS

First Embodiment
1. Overall Configuration

Figure 1:
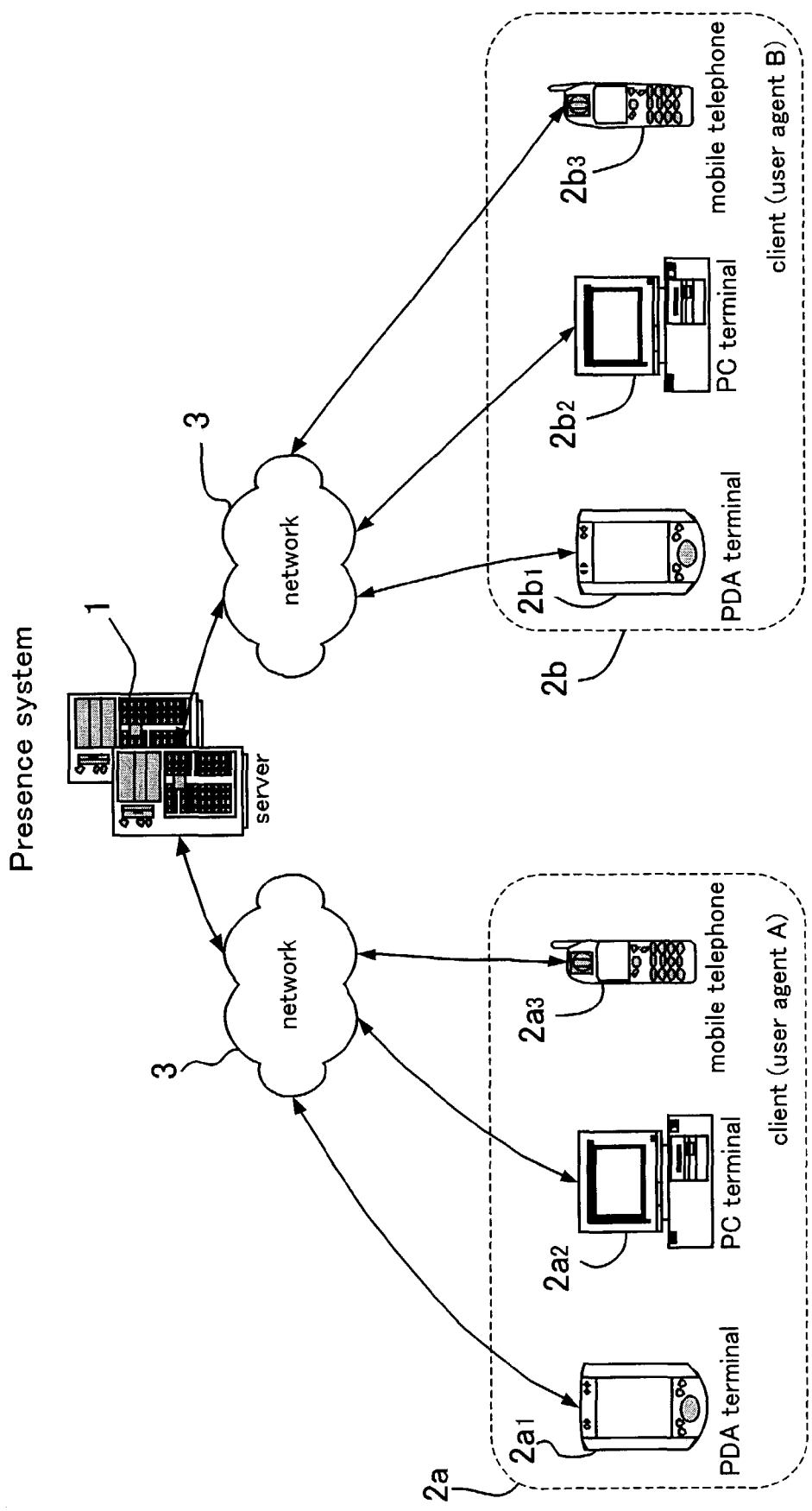
FIG. 1 shows the overall configuration of a presence system according to a first embodiment of the invention.

FIG. 1 schematically shows the configuration of a presence system according to a first embodiment of the present invention. This presence system comprises a server 1 and a plurality of clients 2a, 2b..., and so forth. The clients 2a, 2b... and the server 1 are connected by a network 3, which includes the Internet, an intranet, a mobile communication network, and so forth.

The clients 2a, 2b . . . are operated by user agents A, B . . . , and so forth. In this presence system, one user agent A has one client 2a comprising one client or a plurality of clients $2a_1, 2a_2, 2a_3$. For example, a user agent A may operate a PDA terminal $2a_1$, a PC terminal $2a_2$, and a mobile telephone $2a_3$, which may serve as the client 2a. A client or a plurality of clients for a given user agent A are hereinafter collectively referred to as a client 2a.

In this presence system, all the clients $2a_1, 2a_2$, and $2a_3$ of the user agent A may be connected to the server 1. Even in such cases, the buddies of the user A and their presence information that are displayed on the clients $2a_1, 2a_2$, and $2a_3$ are synchronized. It is preferable that attribute information other then the buddy information, for example, display attribute information of the buddies, be also synchronized between a plurality of clients.

In the following, the functions of the server 1 and the client 2 are described under the assumption that all the clients $2a_1$, $2a_2$, and $2a_3$ of the user agent A are connected to the server 1.

2. Server and Client

Figure 2:
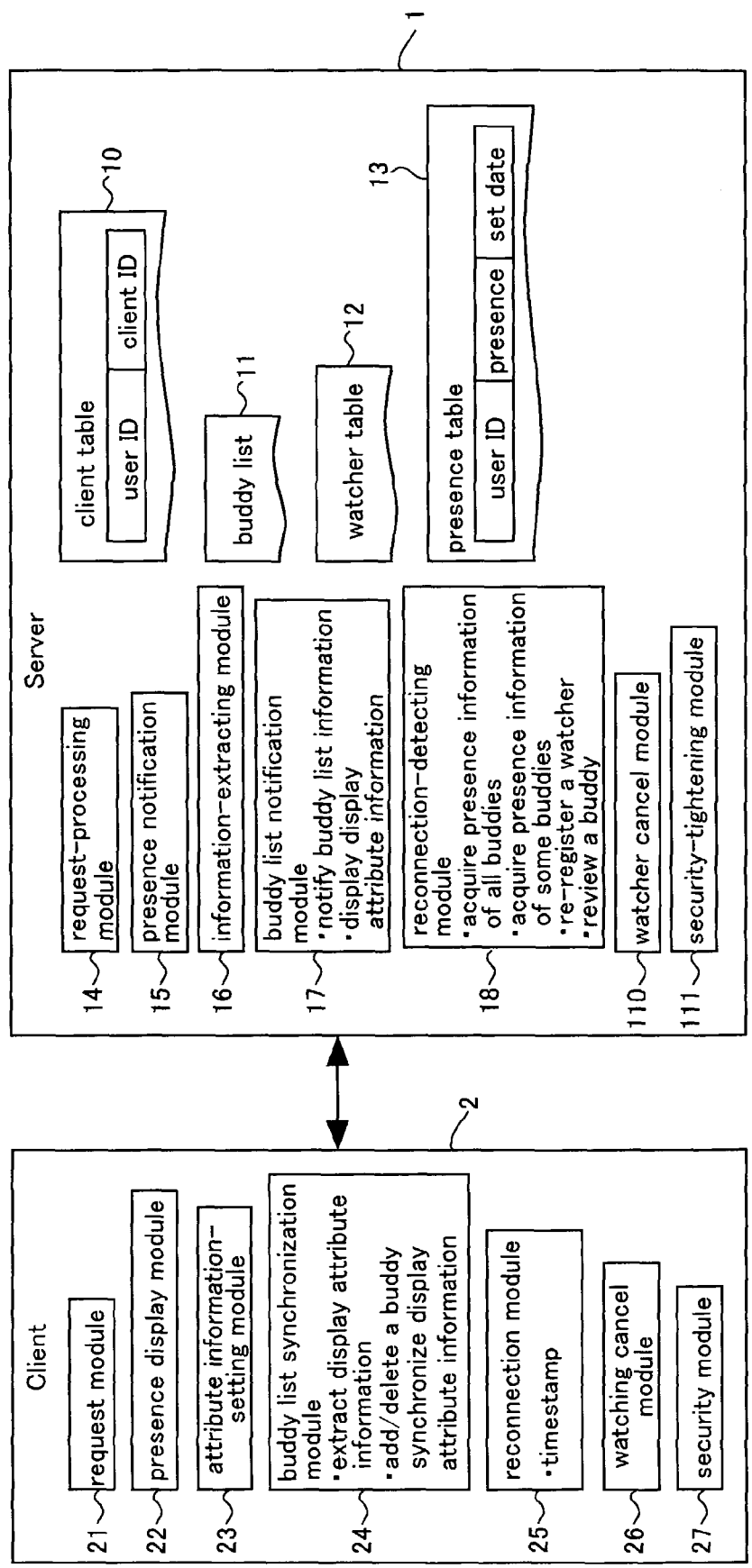
FIG. 2 is a functional block diagram of a server and a client.

FIG. 2 is a block diagram showing the functions of the server 1 and a client 2. The server 1 and the client 2 have a plurality of modules and a plurality of tables. Each of the modules and tables is described below.

2.1 Primary Processes

The server 1 has a client table 10, a buddy list 11, a watcher table 12, a presence table 13, a request-processing module 14, and a presence notification module 15 to perform the primary processes required for a server in the presence system. The client 2 has a request module 21 and a presence display module 22 to perform the primary processes required for a client in the presence system. The primary processes performed by these tables and modules are broadly grouped as a "presence setting process", a "buddy setting process", a "presence display process", and a "presence notification process".

The presence setting process is carried out as follows. The presence information of a given user agent A is transmitted from the request module 21 to the request-processing module 14 and is then stored into the presence table 13. It is preferable that the presence table 13 also store the date and time at which the presence information is set, together with the presence information. New presence information may be automatically generated by the request module 21, or may be input by the user agent A.

The buddy setting process is carried out as follows. The user agent A specifies the user ID of another agent, i.e. buddy (hereinafter referred to as a buddy ID) which the user agent A wishes to reference the status. The buddy ID is transmitted from the request module 21 to the request-processing module 14 and is then stored into the buddy list 11. For the transmission of the buddy ID, a buddy setting command, for example, "SUBSCRIBE", is used. Meanwhile, the user ID of the user agent A is stored into the watcher table 12 as the ID of a watcher of the specified buddy. Specific examples of the buddy list 11 and the watcher table 12 will be described later. Prior to adding a new watcher to the watcher table 12, it is possible to confirm with a buddy who becomes a presentity whether or not a notification of the presence information to a new watcher is permitted. It should be noted that a user ID is such an identifier that the server 1 can identify each of the user agents in the presence system.

The presence display process is carried out as follows. The user ID of a buddy of the user agent A and his/her presence information are transmitted to a given client 2a that is connected to the server 1. Specifically, the ID of the buddy of the user agent A is read out from the buddy list 11 by the presence notification module 15. Subsequently, the presence information of each of the buddies is read out from the presence table 13 by the presence notification module 15. The buddy ID and the presence information that have been read out are transmitted to the client 2a using a presence notification command, such as "NOTIFY". The transmitted presence information of each of the buddies is displayed on the client 2a by the presence display module 22.

The presence notification process is carried out as follows. When the presence information of a given user agent A is updated, the presence information is read out from the presence table 3 by the presence notification module 15. Subsequently, the watcher ID of the user agent A is extracted from the watcher table 12. The updated presence information of the user agent A is transmitted to the client 2 of the extracted watcher. For this presence notification, a presence notification command such as "NOTIFY" is used, as in the foregoing. The presence information that has been notified of is displayed by the presence display module 22 as new presence information of the buddy. Each client 2 of the watcher is extracted from the client table 10. The client table 10 stores user IDs as well as client IDs that are identified by the user IDs so that they are associated with each other.

2.2 Attribute Information Setting Process

In this presence system, a given user agent A can set attribute information relating to a buddy into the server 1. In the following explanation, display attribute information of a buddy list is taken as an example of the attribute information. To set display attribute information, the server 1 has an attribute information-extracting module 16 and the client 2 has an attribute information-setting module 23. The functions of these modules are described below.

Buddy Setting Message

Figure 3:
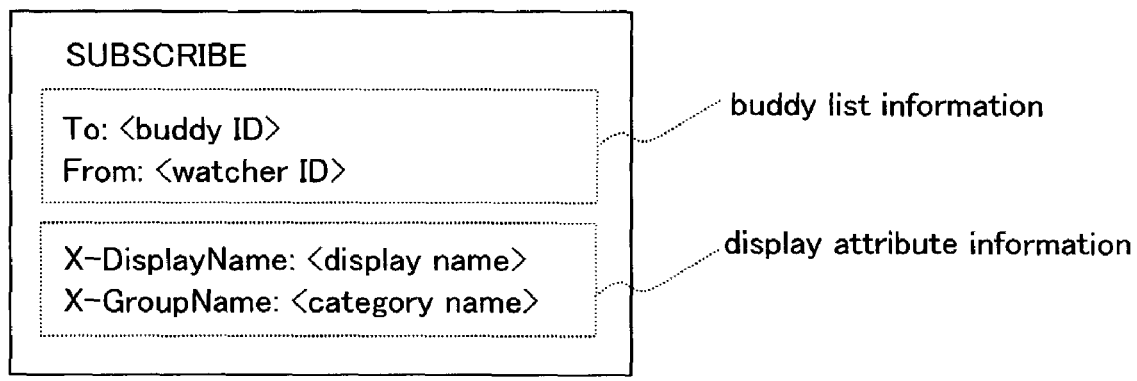
FIG. 3 shows an example of the format of a buddy setting message.

FIG. 3 shows an example of the format of a buddy setting message. The buddy setting message is generated by the request module 21 and sent to the server 1. Normally, the buddy setting message includes a buddy setting command "SUBSCRIBE" and buddy list information, and is generated by the request module 21. In the buddy setting message, display attribute information is also embedded by the attribute information-setting module 23.

The buddy setting command "SUBSCRIBE" indicates that the message is for requesting the server to add as a buddy. The buddy list information contains a buddy ID and a watcher ID. Here, the buddy ID represents the identifier of a user agent specified as the buddy. The watcher ID represents the identifier of the user agent who is the original requester. The display attribute information contains buddies' "display names" and "category names" that indicate categories of the buddies as seen by the watcher.

Server Processes (Attribute Information-Extracting Module)

Display attribute information in the buddy setting message is extracted by the attribute information-extracting module 16 and is written into the buddy list 11. FIG. 4 schematically shows the information stored in the buddy list 11. The buddy list 11 stores the buddy list information and the display attribute information. Specifically, it stores a watcher ID, buddy IDs, display names, and categories into one record. This figure shows that a user agent A (user ID:User-A@fujitsu.com) sets four user agents, who are displayed with the display names "shingo", "ohno", "okuyama", and "kakuta", as his/her buddies.

FIG. 5 schematically shows the concept of the watcher table 12. As already described above, the watcher table 12 is created based on the buddy setting message. The watcher table 12 contains a presentity ID and watcher IDs in one record. The buddy ID in the buddy setting message is written in as a presentity ID. The watcher ID in the buddy setting message is stored in the watcher table 12 as a watcher ID.

2.3 Buddy List Synchronization Process

In this presence system, displays of buddy lists are synchronized between a plurality of clients that are simultaneously operated by one user agent A. For this synchronization, the server 1 has a buddy list notification module 17 and the client 2 has a buddy list synchronization module 24. The functions of these modules are detailed below.

Presence Notification Message

Figure 6:
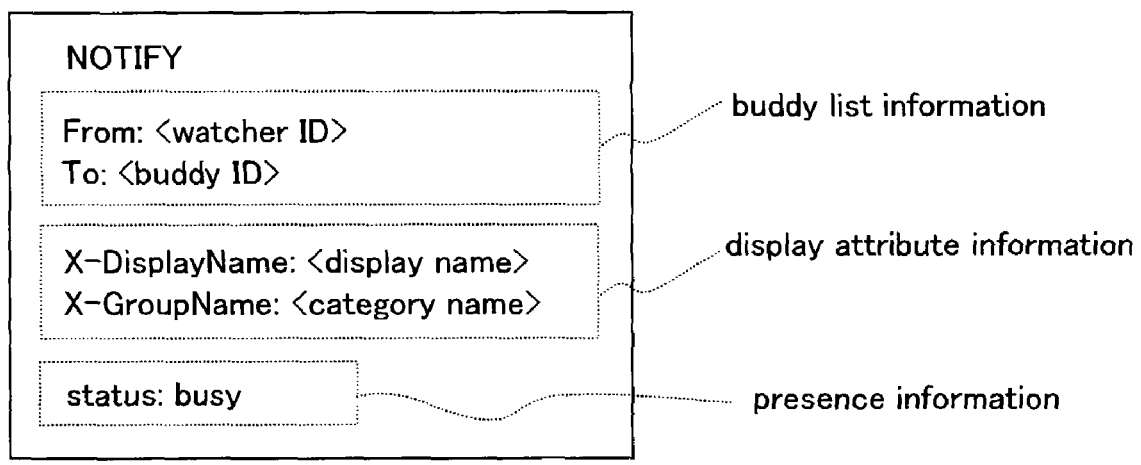
FIG. 6 shows an example of the format of a presence notification message.

FIG. 6 shows an example of the format of a presence notification message. The presence notification message is generated by the presence notification module 15 of the server 1. This message contains a presence notification command "NOTIFY", buddy list information, and presence information. In the presence notification message shown in FIG. 6, display attribute information of the buddy is also embedded by the buddy list notification module 17. The display attribute information is information that a watcher sets for each of the buddies, which is read out from the buddy list 11. It should be noted that, in addition to the display attribute information, various attribute information related to the user agent may be embedded in the presence notification message.

2.3.1 Notification Process of a New Buddy

The foregoing presence notification message is used in a "notification process of a new buddy" and an "update notification process of display attribute information", in addition to the presence notification process in the primary processes. First, the "notification process of a new buddy" is described below.

Server Process (Buddy List Notification Module)

For simplicity in illustration, it is assumed that, using a client $2a_1$, a user agent A adds a buddy B (display name: Mr. Fukui) in the buddy list. The buddy B is recorded in the buddy list 11 as a buddy of the user agent A. The user agent A is recorded in the watcher table 12 as a watcher of the buddy B. Subsequently, presence information of the new buddy B is notified by the presence notification message. The destination of the notification is the clients $2a_1$, $2a_2$, and $2a_3$ to which the user agent A is being connected. The presence notification message is generated by an instruction from the buddy list notification module 17.

Client Process (Buddy List Synchronization Module)

The clients $2a_1$, $2a_2$, and $2a_3$ that have received the presence notification message carry out the following processes. First, the buddy list information is extracted from the presence notification message to judge if a new buddy is added. In other words, the buddy list synchronization module 24 compares the buddy ID that has been notified of with the buddy ID whose presence information has already been displayed, in order to judge whether or not a new buddy is added. If the buddy ID in the presence notification message is a new buddy ID, the foregoing message is interpreted as a notification of a new buddy. Thereafter, the display name and the presence information of the buddy is newly displayed. Thus, when a given user agent A adds a buddy B using the client $2a_1$, for example, presence information of the buddy B is displayed on the clients $2a_1$, $2a_2$, and $2a_3$.

2.3.2 Display Attribute Update Notification Process

Server Process (Buddy List Notification Module)

Next, the display attribute update notification process is detailed. For simplicity in illustration, it is assumed that the user agent A changes display attribute information of the buddy B using the client $2a_1$. For example, the display name of the buddy B is changed from "Mr. Fukui" to "fukui". The new display name "fukui" is written into the buddy list 11 by the request-processing module 14. Subsequently, the new display name of the buddy B is notified by the presence notification message. The destinations of the notification are at least $2a_1$, $2a_2$, and $2a_3$. This presence notification message is generated by an instruction from the buddy list notification module 17.

Client Process (Buddy List Synchronization Module)

The clients $2a_1$, $2a_2$, and $2a_3$ judge whether or not a notification is the "notification of a new buddy", as described above. Thereafter, when it is determined that the notification is not for a new buddy, it is judged whether the display attribute information of the buddy B in the presence notification message is updated. The display attribute information of the buddy displayed in the presence display is stored by the buddy list synchronization module 24. If it has been updated, the foregoing message is judged as "update notification of display attribute information". As a result, the presence display of the buddy B is updated according to the new display attribute information. Thus, the clients $2a_1$, $2a_2$, and $2a_3$ of the user agent A display the buddy B with the new display name. It should be noted that, when the display attribute information is a category name of the buddy B, the buddy B is displayed as one of the buddies who belong to a new category.

Screen Example

Figure 7A:
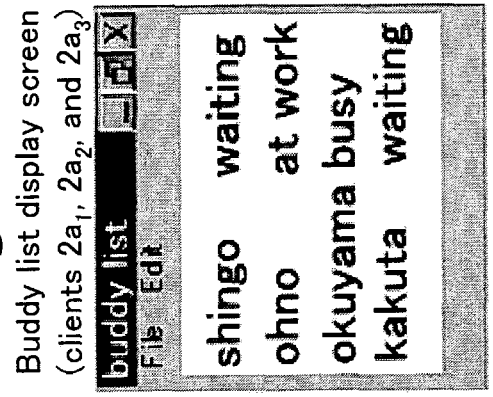
FIG. 7A shows an example of a buddy list display screen (client $2a_1$)
Figure 7B:
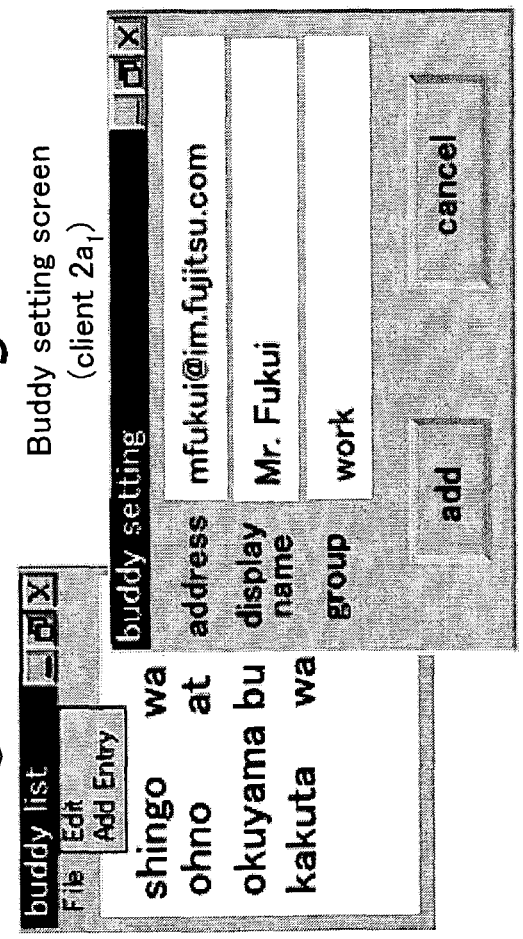
FIG. 7B shows an example of a buddy setting screen.
Figure 7C:
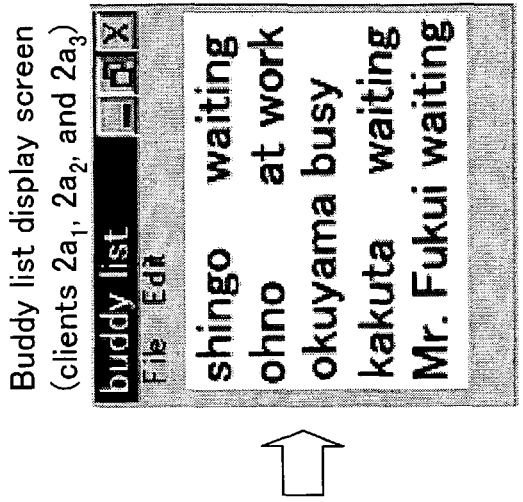
FIG. 7C shows an example of the buddy list display screen displayed after a new buddy has been set (clients $2a_1$, $2a_2$, and $2a_3$)

FIG. 7 shows an example of screen changes that shows buddy list synchronization between a plurality of clients $2a_1$, $2a_2$, and $2a_3$. FIG. 7A shows a buddy list display screen that is an example of the presence display. It is now assumed that this screen is displayed on the three clients $2a_1$, $2a_2$, and $2a_3$ of the user agent A. FIG. 7B shows an example of buddy setting screen. This figure shows that a new buddy B (display name: Mr. Fukui) is added in the client $2a_1$. FIG. 7C shows a new buddy list display screen. The server 1 notifies the user agent A's clients $2a_1$, $2a_2$, and $2a_3$ of the presence information of the newly added buddy B and the display attribute information. In other words, a presence notification message is transmitted to these three clients. Thus, the presence information of "Mr. Fukui" is additionally displayed on these three clients.

Figure 8A:
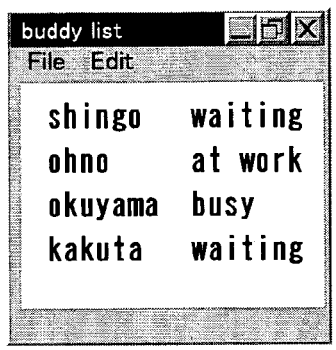
FIG. 8A shows an example of the buddy list display screen (clients $2a_1$, $2a_2$, and $2a_3$)
Figure 8B:
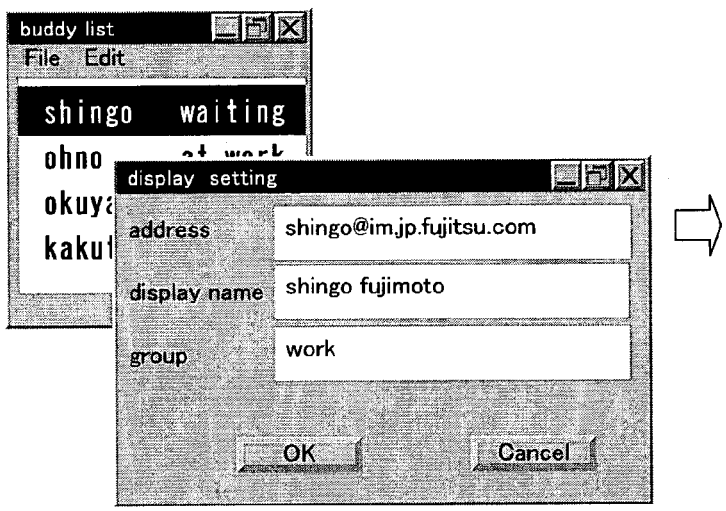
FIG. 8B shows an example of a display attribute setting screen (client $2a_1$)
Figure 8C:
FIG. 8C shows an example of the buddy list display screen displayed after the display attributes have been updated (client $2a_1$, $2a_2$, $2a_3$)
Figure 10A:
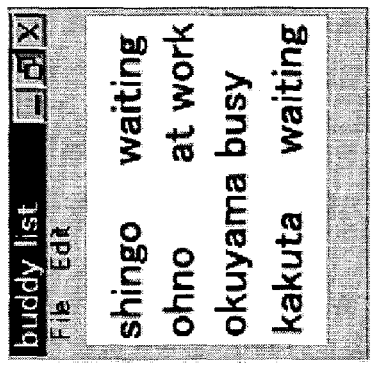
FIG. 10A shows an example of a buddy list display screen displayed immediately after startup (client $2a_1$)
Figure 10B:
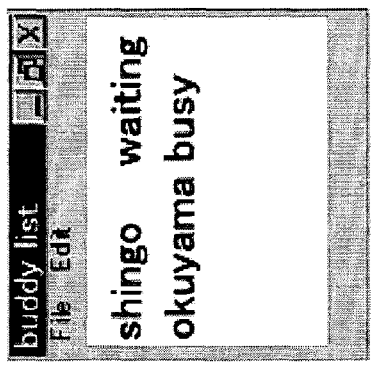
FIG. 10B shows an example of a buddy list display screen displayed while the presence notification message shown in FIG. 9(c) is being received (client $2a_1$)
Figure 10C:
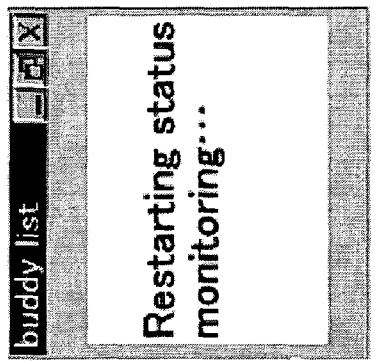
FIG. 10C shows an example of a buddy list display screen displayed after the presence notification message shown in FIG. 9(c) has been received (client $2a_1$)
Figure 10D:
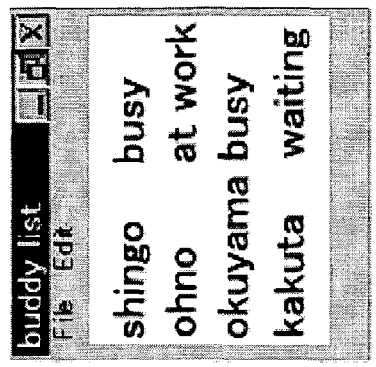
FIG. 10D shows an example of a buddy list display screen in which the update of the presence information of the buddies has been reflected (client $2a_1$)

FIG. 8 shows an example of screen changes showing that the display attribute information is synchronized in addition to the buddy information. FIG. 8A shows an example of the buddy list display screen displayed by the clients $2a_1$, $2a_2$, and $2a_3$ of the user agent A. FIG. 8B shows an example of display attribute information-setting screen. This figure shows that the display name "shingo" of the buddy B is changed into "Shingo Fujimoto" in the client $2a_1$. FIG. 8C shows a buddy list display screen that is displayed on the clients $2a_1$, $2a_2$, and $2a_3$ after the display attribute information is changed. The display name of the buddy B has been changed into "Shingo Fujimoto".

2.4 Reconnection Process

A connection between the server 1 and the client 2 can be disconnected due to disorder of the network 3 or the power off of the client 2. In this presence system, when any client $2a_1$ of the user agent A connects with the server 1, the presence displays in the other clients $2a_2$ and $2a_3$ are synchronized. For this process, the server 1 has a reconnection-detecting module 18 and the client 2 has a reconnection module 25. The functions of these modules are described below.

2.4.1 Reconnection Process

Reconnection Message FIG. 9A and FIG. 9B show examples of the formats of reconnection message. The reconnection message is generated by the reconnection module 25 and is transmitted to the server 1 by the request module 21.

FIG. 9A depicts an example of the format of the reconnection message (type 1) that does not contain a timestamp. The reconnection message contains a command "LOGON" that indicates a reconnection request and an original requester user ID.

FIG. 9B shows an example of the format of the reconnection message (type 2) with a timestamp. This message further contains a timestamp. This message is generated to acquire the presence information of a buddy that has changed after the time indicated by the timestamp. The timestamp is not essential information for the reconnection message. For example, when a reconnection is made after a connection has been disconnected for a long time, it is desirable that the presence information of all the buddies be acquired, and therefore the timestamp is unnecessary. Conversely, for example, when the server 1 and the client 2 are connected through UDP (User Datagram Protocol), timestamps are effective. For example, it is conceivable that when no communication is received from the server 1 for 30 minutes or longer, the client 2 transmits a reconnection message (type 2) to the server 1.

Server Process (Reconnection-Detecting Module)

FIG. 9C schematically illustrates a presence notification message for a reconnection message. This presence notification message also contains similar information to the information contained in the presence notification message shown in FIG. 6. The presence information or the like of all or some of the user agent A's buddies, which has been extracted based on the reconnection message, is transmitted from the server 1 to the client 2. For example, when the reconnection message (type 1) is detected, the presence information and display attribute information of all the user agent A's buddies are transmitted to the clients $2a_1$, $2a_2$, and $2a_3$. When the reconnection message with timestamp (type 2) is detected, the presence information and display attribute information of some of the user agent A's buddies are transmitted to the clients $2a_1$, $2a_2$, and $2a_3$. These some of the user agent A's buddies are those who have the presence information that has been set after the time indicated by the timestamp. The instructions to detect the reconnection messages and to transmit the presence notification messages are carried out by the reconnection-detecting module 18.

Screen Examples

FIG. 10 shows examples of buddy list display screens displayed on the client $2a$, that has been reconnected. This figure shows the screen examples displayed when the client $2a_1$ transmits the reconnection message (type 1). FIG. 10A shows an example of the screen displayed immediately after start up. Initially, the client $2a_1$ has acquired neither the presence information nor the display attribute information of any buddies immediately after its startup. FIG. 10B shows an example of the buddy list display screen displayed while the presence information of buddies or the like is being acquired from the server 1. FIG. 10C shows an example of buddy list display screen displayed when the presence information and display attribute information of all the buddies have been acquired.

2.4.2 Watcher Re-Registering Process (Reconnection-Detecting Module)

When the user agent A does not connect with the server 1 from any of the clients $2a_1$, $2a_2$, and $2a_3$ for a long period, there are cases where the user agent A is deleted from the watcher table 12. This is because the presence notification to a user agent A who does not use the system for a long time is a waste of the network resource. Nevertheless, it is preferable that the presence notification to the user agent A be restarted when the user agent A who was deleted from the watcher table 12 reconnects with the system. In addition, it is preferable that permission be obtained from the presentity when the presence notification to the user agent A is restarted. The reason is that, even when the presentity previously approved the notification of the presence information to the user agent A, the presentity can change his/her mind as time elapses.

Some presence systems can set each presentity's access level to the presence information in the presence table 13. If this is the case, it is possible to judge whether the presence notification can be restarted without obtaining the permission from the presentity.

The presence notification to a reconnected user agent A can be restarted by reregistering the user ID of the user agent A in the watcher table 12. The re-registering is performed by the reconnection-detecting module 18. The presentities of the user agent A can be determined from the buddy list 11 of the user agent A. FIG. 10(*d*) depicts an example of the screen showing that a presence notification has been transmitted to the client $2a$ after reconnection. By the restart of the presence notification, the user agent A can be informed of the presence information of the buddies at the time of reconnection as well as the latest presence information of the buddies thereafter.

2.4.3 Buddy Reviewing Process (Reconnection-Detecting Module)

The buddy who is determined in the above-described watcher re-registering process that he/she cannot restart the presence notification to the user agent A may be deleted from the buddy list of the user agent A. Thus, the memory resource inside the server 1 can be effectively used. The deleting of a buddy is performed by the reconnection-detecting module 18.

2.4.4 Overview of the Processes at Reconnection

Figure 11:
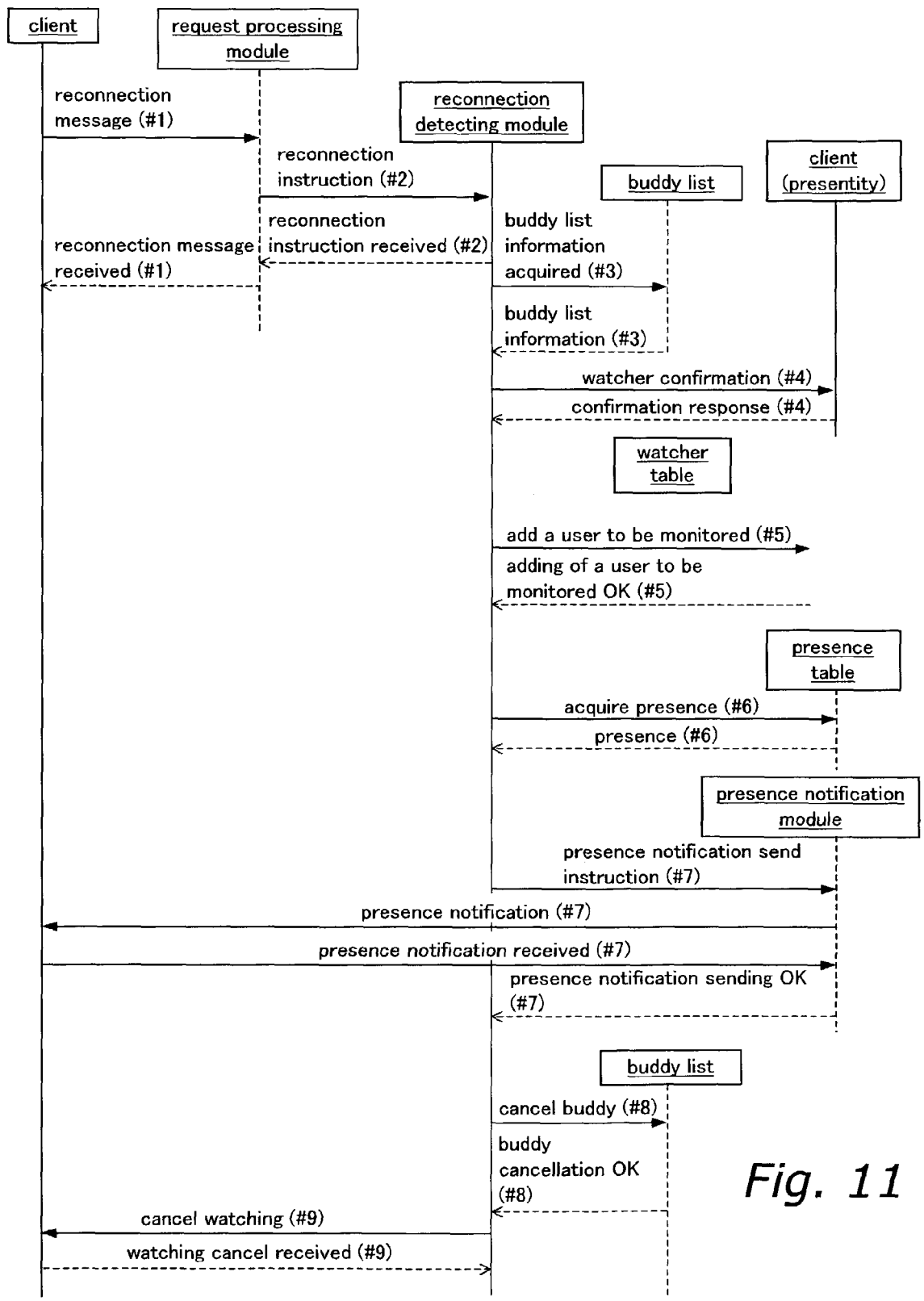
FIG. 11 illustrates a detailed flow of a reconnection process.

FIG. 11 shows an overview of the process flows at reconnection. First, a reconnection message is transmitted from the client 2 to the server 1. The reconnection message is passed from the request-processing module 14 to the reconnection-detecting module 18 (#1). Then, the reconnection message is interpreted, and the buddy list information of the client $2a_1$ is read out from the buddy list (#2, #3). Then, a confirmation is made to the buddies whether they permit the presence notification to be made (#4). Thereafter, for the buddies who gave permission for the present notification, the user agent A is registered in the watcher table 12 as a watcher of the buddies (watcher re-registering process) (#5).

The presence information of the buddies of whom the user agent A again became a watcher is read out from the presence table 13 (#6). If the reconnection message contains a timestamp, the present information and its display attribute information that have been set after the time indicated by the timestamp are read out from the presence table 13 (#6). Subsequently, a presence notification message containing the presence information, the buddy list information, and the display attribute information, is transmitted from the presence notification module 15 to the client $2a_1$ (#7).

Those buddies who did not give the permission for the presence notification may be deleted from the buddy list of the user agent A (buddy reviewing process) (#8). Alternatively, the clients $2a_1$, $2a2$, and $2a_3$ may be notified that the user agent A is no longer a watcher of the buddy (#9). This notification can be performed by transmitting a later-described watching cancel message.

2.5 Watching Cancel Process

In the presence system, distribution relationship for the presence information can be cancelled for some reason related to the server 1. In this case, a watcher may be notified that the presence information of a presentity has not distributed. The notification is carried out by transmitting a watching cancel message from the server 1 to the client 2. For sending and receiving this message, the server 1 has a watcher cancel module 110 and the client 2 has a watching cancel module 26.

Watching Cancel Message

FIG. 12A shows an example of the format of the watching cancel message. This message is generated by the watcher cancel module 110 and is transmitted to the client 2 by the presence notification module 15. The watching cancel message contains a cancel command "Subscription-State: terminated", in addition to the presence notification command "NOTIFY" and the buddy list information. The cancel command indicates that the presence notification for the buddy identified by a buddy ID in the buddy list information has been cancelled.

Client Process (Watching Cancel Module)

FIGS. 12B and 12C show an example of changes in the buddy list display screen by the watching cancel module 26. FIG. 12B shows the buddy list display screen displayed before a watching cancel message is received. FIG. 12C shows the buddy list display screen displayed after the watching cancel message has been received. After the watching cancel message has been received, a buddy deleted from the buddy list and his/her presence information are deleted from the display. The change of the display screen is carried out as follows. First, the watching cancel message is passed to the watching cancel module 26 to determine a buddy to be deleted. Then, deletion of the buddy from the display is instructed to the presence display module 22. Subsequently, by an instruction from the watching cancel module 26, the information corresponding to the buddy is deleted from the buddy list information and the display attribute information stored by the buddy list synchronization module 24.

In the example of the watching cancel message shown in FIG. 12A, the reference to the presence information of the user with the user ID: mfukui@im.jp.fujitsu.com (display name: Mr. Fukui) by the user agent A with the user ID: user-A@im.jp.fujitsu.com cancels is cancelled. Accordingly, after the watching cancel message has been received, the buddy "Mr. Fukui" and his presence information, which have been displayed as shown in FIG. 12B, are deleted from the buddy list, as shown in FIG. 12C.

2.6 Security Tightening Process

In the presence system, the presence information of a user agent other than the buddies of the user agent A can be transmitted to the client $2a$. When such a presence notification is carried out, it is preferable that the server 1 gives the client $2a$ a warning that the presence notification is a presence notification of a user agent C that is other than the buddies. It is also preferable that the client $2a$ that has received the warning perform a process according to the warning. For example, the client $2a$ may notify the user agent A of the warning, or it may ignore such presence notifications. In order to carry out such processes, the server 1 has a security-tightening module 111 and the client 2 has a security module 27.

Warning Message

Figure 13A:
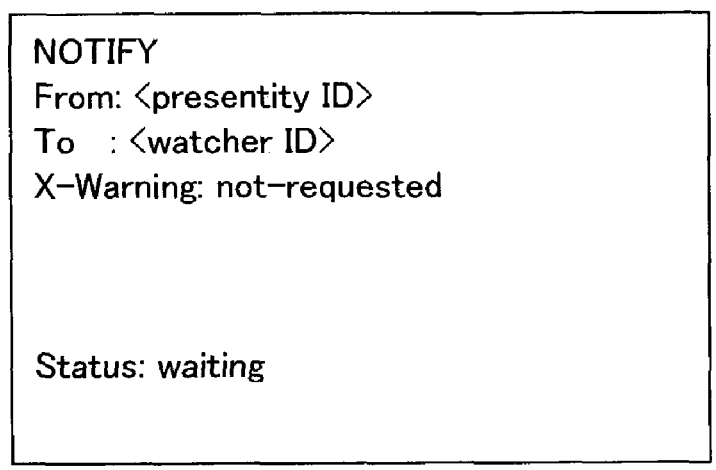
FIG. 13A shows an example of the format of a warning message.

FIG. 13A shows an example of the format of a warning message. The warning message is generated by the security-tightening module 111 and is transmitted to the client 2 by the presence notification module 15. The warning message contains a warning command "X-Warning: not-requested", in addition to the presence notification command "NOTIFY", the buddy list information, and the presence information. The buddy list information contains the user ID of a user agent C, who is not a buddy of the user agent A.

Client Process (Security Module)

Figure 13B:
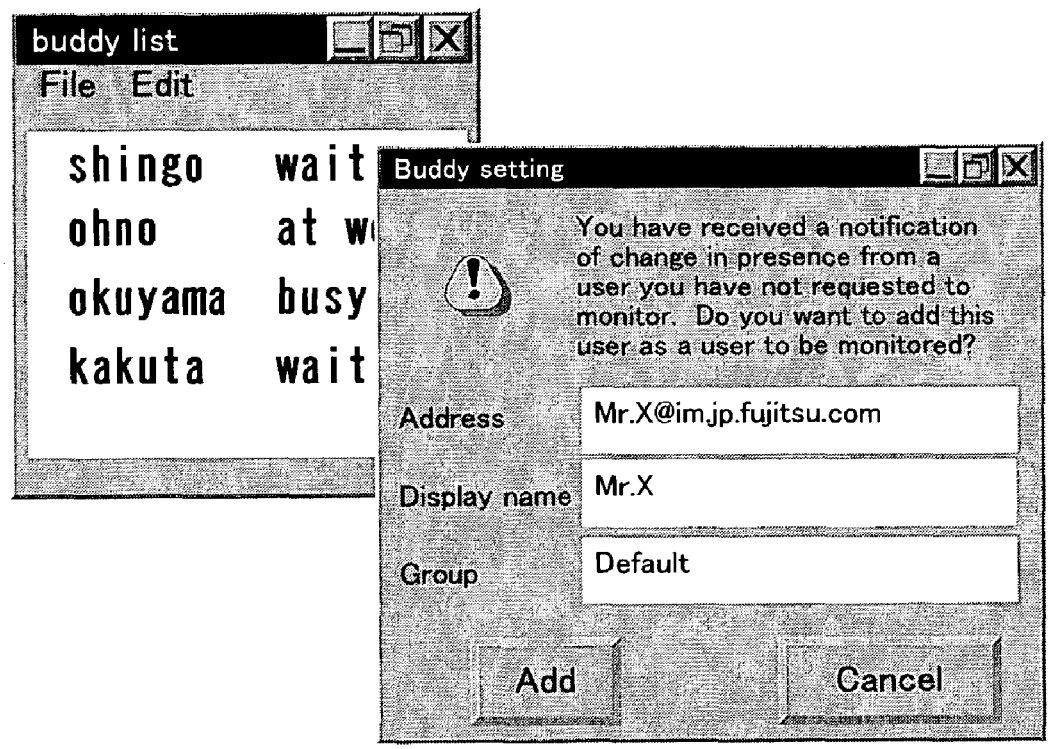
FIG. 13B shows an example of a warning display screen displayed when the warning message is received.

FIG. 13B shows an example of a warning display screen displayed by the client $2a$ who has received the warning message. The warning command in the warning message is extracted by the security module 27. Thereafter, the warning display screen accepts selection of whether the user agent C is set as a buddy or not. If the user agent C is selected to be set as a buddy, a buddy setting message for setting the user agent C as a buddy is transmitted to the server 1. If the user agent C is not selected to be set as a buddy, the presence notification of the user agent C may be ignored, for example. This function makes it possible to prevent an unknown user agent C from being added to the buddy list unconsciously and prevent the presence information thereof from being displayed unilaterally.

3. Process Flow

Server

Figure 14:
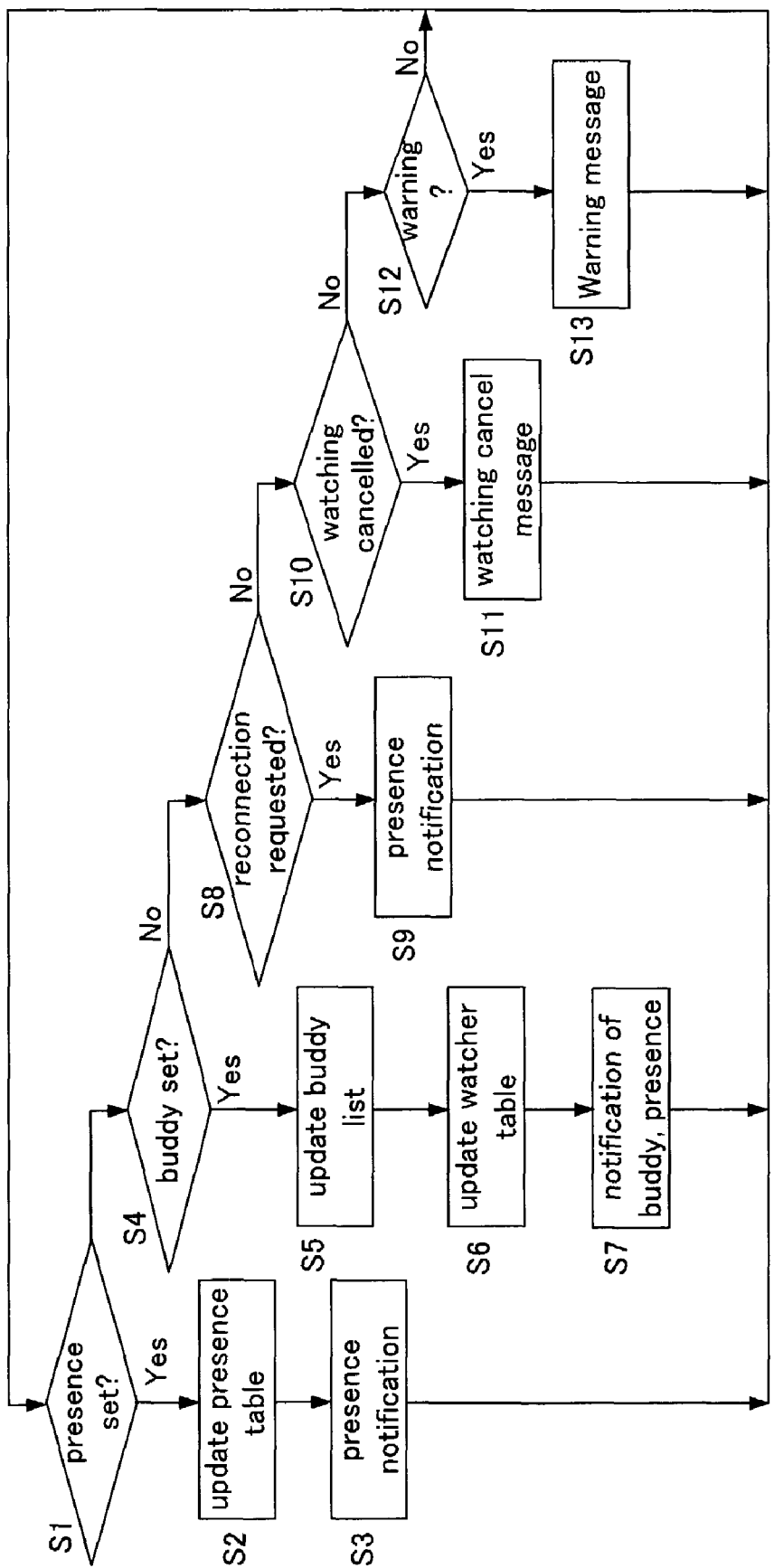
FIG. 14 is a flow-chart showing the flow of a main process performed by a server.

FIG. 14 is a flow-chart showing the flow of primary processes performed by the server 1. The server 1 starts predetermined processes when predetermined events occur.

Steps S1, S2, and S3: When the server 1 receives new presence information from any client 2 (S 1), the server 1 stores the information into the presence table 13 (S2). In addition, the server 1 identifies the user agent corresponding to the client 2 from the client table 10 and transmits the presence notification to the client 2 of the watcher of the user agent (S3).

Steps S4 to S7: When the server 1 receives a buddy setting message from any client 2 (S4), the server 1 updates the buddy list 11 and the watcher table 12 (S5, S6). If no new buddy is added, it is unnecessary to update the watcher table 12. Subsequently, all the clients of the user agent corresponding to that client 2 are extracted from the client table 10, and the presence notification of buddies is transmitted to the extracted clients (S7). This presence notification may be either the above-described "notification of a new buddy" or "update notification of display attribute information".

Steps S8 and S9: When the server 1 receives a reconnection request from any client 2 (S8), the server 1 reads out the presence information and the display attribute information of the buddies of the user agent corresponding to the client 2 from the buddy list 11. Subsequently, the presence notification is transmitted to the client of the original requester (S9).

Steps S10 and S11: When the server 1 deletes a buddy of any given user agent (S10), the server 1 transmits a watching cancel message to the client 2 (S11). The destination of the transmission is all the clients corresponding to the user agent.

Steps S12 and S13: When the server 1 carries out a presence notification of a user agent other then the buddies to the client 2 of any user agent (S12), the server 1 transmits a warning message (S13).

Client

Figure 15:
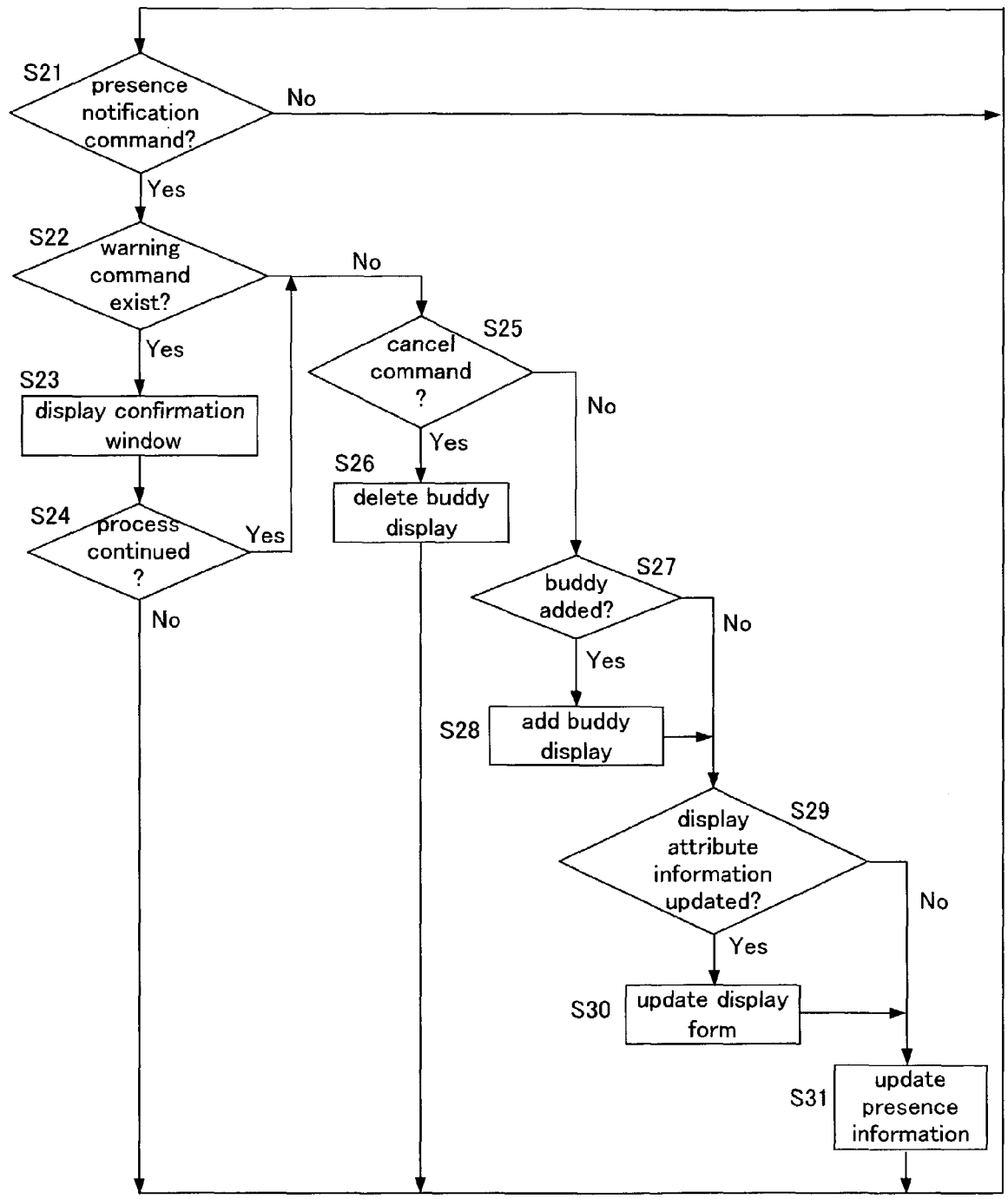
FIG. 15 is a flow-chart showing the flow of a process performed by a client that has received a presence notification command.

FIG. 15 is a flow-chart showing the flow of the process that is carried out when the client 2 receives a presence notification command "NOTIFY" from the server 1.

Steps S21, S22, S23, and S24: When the client 2 receives a presence notification command (S21), the client judges whether or not a warning command is appended to the presence notification command (S22). If a warning command is appended, the client 2 may display a confirmation window (S23). This confirmation window accepts, from an operator, a selection of whether the owner of the presence information contained in the presence notification message may be set as a buddy or not (S24).

Steps S25 and S26: When "set as a buddy" is selected in the foregoing step S24, the client 2 judges whether or not a cancel command is appended to the presence notification command (S25). If a cancel command is appended, the client 2 may delete the buddy whose notification is sent with the presence notification command, and the display of the presence information thereof (S26).

Steps S27 and S28: The client 2 judges whether or not a notification of a new buddy has been made, or whether or not new presence information of any buddy has been made (S27). If a notification of a new buddy is made, the new buddy is displayed in the buddy list screen (S28).

Steps S29, S30, and S31: When the display attribute information of the buddies is updated (S29), the client 2 updates the display format of the buddy list screen (S30). Thereafter, the presence information that has been sent together with the presence notification command is displayed in the buddy list screen (S31).

In the present embodiment, the presence notification command "NOTIFY" is used for a presence notification of a buddy, a notification of a new buddy, a notification of display attribute information, a notification of cancel of a buddy, and a warning. The timings of notifications are, when the presence information of a buddy is updated, when a new buddy is set, when the display attribute information is updated, when a buddy is cancelled, and when the presence notification of an unknown presentity is made, respectively. Thus, in cases where one user uses a plurality of terminals in the presence system, a dynamically changing buddy list can be synchronized between the terminals. Moreover, the display format of the buddy list does not vary between the terminals, and the list is displayed with the same format.

Other embodiments

A) The attribute information is not limited to display attribute information. For example, the watching cancel command is attribute information related to the user agent who is to be deleted from the buddy list. The warning command is attribute information related to the owner of the presence information that is transmitted together with the warning command. In addition to these, various attribute information related to a user agent may be transmitted along with the presence notification command as needed.

B) The present invention encompasses storage media that store a program that executes the above-described method according to the present invention. Examples of the storage media include flexible disks, hard disks, semiconductor memories, CD-ROMS, DVDs, magneto-optical disks (MOs), and the like.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A presence administration method comprising:
    executing at a presence administration device:
        storing in a client table a first user identifier in association with identifiers of a plurality of client devices operated by the first user;
        storing in a buddy list, of the first user, a second user identifier and a display name for a second user named by the first user, in association with the first user identifier, where
            the second user identifier identifies a second user whose presence information is to be watched by the first user, and
            the display name corresponds to the second user identifier in the buddy list;
        storing in a watcher list of the first user, the first user identifier in association with the second user identifier from the buddy list;
        storing in a presence table presence information in association with the second user identifier;
        upon update of the presence information of the second user, referring to the watcher list of the first user and notifying, to the plurality of client devices for the first user in the client table, updated presence information associated with the second user identifier in the presence table;
        upon update of the buddy list of the first user, including when a change of the display name of the second user in the buddy list of the first user is accepted, notifying, to the plurality of client devices for the first user in the client table, updated buddy list information of the first user;
        storing a notified last connection time that is a time at which a client device of the first user has last communicated with the presence administration device; and
        acquiring updated buddy list information from the buddy list of the first user updated after the last connection time to the presence administration device, and presence information of one or more buddies which are on the buddy list updated and of which presence information has changed after the last connection time.

2. The presence administration method as set forth in claim 1, wherein:
the buddy list of the first user includes attribute information of the second user in association with the first user identifier; and
updated buddy list information of the first user includes updates to the attribute information of the second user.

3. The presence administration method as set forth in claim 1, further comprising detecting a reconnection request to the presence administration device from any of the client devices of the first user, and notifying a reconnected client device of the first user of presence information from the watch list of the first user and/or buddy list information from the buddy list of the first user.

4. The presence administration method as set forth in claim 1, further comprising:
storing a log-off time that is latest time at which a client device of the second user has last been connected to the presence administration device;
updating the watcher list of the first user by deleting the second user identifier of the second user from the watcher list of the first user when a predetermined time has elapsed since the log-off time of the second user; and
judging whether the watcher list of the user has been updated when a client device of the first user connects with the presence administration device, and notifying the connected client device of the first user of the updated watcher list.

5. The presence administration method as set forth in claim 4, wherein said judging whether the watcher list of the first user has been updated, performs a confirmation of whether the presence information of the second user is permitted to be distributed to the first user.

6. The presence administration method as set forth in claim 1, wherein it is determined whether the identifier of at least one second user is to be deleted from the buddy list of the first user, and if determined to be deleted, a client device of the first user that is being connected is notified of the identifier of the second user to be deleted.

7. The presence administration method as set forth in claim 1, further comprising judging whether the identifier of the second user is contained in the buddy list of the first user, and if it is not contained, transmitting a warning message in addition to the presence information of the second user to the one or more client devices of the first user.

8. A presence administration device, comprising:
a computer processor configured for executing:
storing in a client table a first user identifier in association with identifiers of a plurality of client devices operated by the first user;
storing in a buddy list, of the first user, a second user identifier and a display name for a second user named by the first user, in association with the first user identifier, where
the second user identifier identifies a second user whose presence information is to be watched by the first user, and
the display name corresponds to the second user identifier in the buddy list;
storing in a watcher list of the first user, the first user identifier in association with the second user identifier from the buddy list;
storing in a presence table presence information in association with the second user identifier;
upon update of the presence information of the second user, referring to the watcher list of the first user and notifying, to the plurality of client devices for the first user in the client table, updated presence information associated with the second user identifier in the presence table;
upon update of the buddy list of the first user, including when a change of the display name of the second user in the buddy list of the first user is accepted, notifying, to the plurality of client devices for the first user in the client table, updated buddy list information of the first user;
storing a notified last connection time that is a time at which a client device of the first user has last communicated with the presence administration device; and
acquiring updated buddy list information from the buddy list of the first user updated after the last connection time to the presence administration device, and presence information of one or more buddies which are on the buddy list updated and of which presence information has changed after the last connection time.

9. A non-transitory computer-readable storage medium storing a presence administration program for causing a presence administration computer to execute operations comprising:
storing in a client table a first user identifier in association with identifiers of a plurality of client devices operated by the first user;
storing in a buddy list, of the first user, a second user identifier and a display name for a second user named by the first user, in association with the first user identifier, where
the second user identifier identifies a second user whose presence information is to be watched by the first user, and
the display name corresponds to the second user identifier in the buddy list;
storing in a watcher list of the first user, the first user identifier in association with the second user identifier from the buddy list;
storing in a presence table presence information in association with the second user identifier;
upon update of the presence information of the second user, referring to the watcher list of the first user and notifying, to the plurality of client devices for the first user in the client table, updated presence information associated with the second user identifier in the presence table;
upon update of the buddy list of the first user, including when a change of the display name of the second user in the buddy list of the first user is accepted, notifying, to the plurality of client devices for the first user in the client table, updated buddy list information of the first user;
storing a notified last connection time that is a time at which a client device of the first user has last communicated with the presence administration device; and
acquiring updated buddy list information from the buddy list of the first user updated after the last connection time to the presence administration device, and presence information of one or more buddies which are on the buddy list updated and of which presence information has changed after the last connection time.

10. A presence-referencing method used for a plurality of client devices operated by a first user and that connects with a computer that administrates presence information by storing in a client table the first user identifier in association with identifiers of the plurality client devices operated by the first user, the method comprising:
- storing in a buddy list, of the first user, a second user identifier and a display name for a second user named by the first user, in association with the first user identifier, where
  - the second user identifier identifies a second user whose presence information is to be watched by the first user, and
  - the display name corresponds to the second user identifier in the buddy list, wherein the computer that administers presence information stores in a presence table presence information in association with the second user identifier;
- storing in a watcher list of the first user, the first user identifier in association with the second user identifier from the buddy list;
- upon update, at the computer, of the presence information of the second user, being notified, at the plurality of client devices for the first user in the client table, of updated presence information associated with the second user identifier in the presence table;
- upon update, at the computer, of the buddy list of the first user, including when a change of the display name of the second user in the buddy list of the first user is accepted, being notified, at the plurality of client devices for the first user in the client table, of updated buddy list information of the first user; and
- acquiring updated buddy list information from the buddy list of the first user updated after a last connection time to the computer, and presence information of one or more buddies which are on the buddy list updated and of which presence information has changed after the last connection time.

11. The presence-referencing method as set forth in claim 10, wherein:
- the buddy list of the first user includes attribute information of the second user in association with the first user identifier; and
- said updated buddy list information of the first user includes updates to the attribute information of the second user.

12. The presence-referencing method as set forth in claim 10, further comprising, receiving the identifier of the second user and a delete message in place of the presence information of the second user from the computer.

13. The presence-referencing method as set forth in claim 10, further comprising receiving from the computer the presence information of a second user who is not in a buddy list of the first user, an identifier of the second user, and a warning message.

14. The presence-referencing method as set forth in claim 13, further comprising subsequent to being notified from the computer of the presence information of a second user, confirming whether the second user is to be added to the buddy list of the first user.

15. A presence-referencing device serving as a client device operated by a first user, comprising:
- a computer processor configured for executing:
  - connecting with a computer capable to administer presence information by:
    - storing in a client table the first user identifier in association with identifiers of a plurality of client devices operated by the first user,
    - storing in a buddy list, of the first user, a second user identifier and a display name for a second user named by the first user, in association with the first user identifier, where
      - the second user identifier identifies a second user whose presence information is to be watched by the first user, and
      - the display name corresponds to the second user identifier in the buddy list,
    - storing in a watcher list of the first user, the first user identifier in association with the second user identifier from the buddy list, and
    - storing in a presence table presence information in association with the second user identifier;
  - upon update, at the computer, of the presence information of the second user, being notified of updated presence information associated with the second user identifier in the presence table;
  - upon update, at the computer, of the buddy list of the first user, including when a change of the display name of the second user in the buddy list of the first user is accepted, being notified of updated buddy list information of the first user; and
  - acquiring updated buddy list information from the buddy list of the first user updated after a last connection time to the computer, and presence information of one or more buddies which are on the buddy list updated and of which presence information has changed after the last connection time.

16. A non-transitory computer-readable storage medium storing a presence-referencing program that causes a client device operated by a first user to execute operations comprising:
- connecting with a computer capable to administer presence information by:
  - storing in a client table the first user identifier in association with identifiers of the plurality of client devices operated by the first user,
  - storing in a buddy list, of the first user, a second user identifier and a display name for a second user named by the first user, in association with the first user identifier, where
    - the second user identifier identifies a second user whose presence information is to be watched by the first user, and
    - the display name corresponds to the second user identifier in the buddy list,
  - storing in a watcher list of the first user, the first user identifier in association with the second user identifier from the buddy list, and
  - storing in a presence table presence information in association with the second user identifier;
- upon update, at the computer, of the presence information of the second user, being notified of updated presence information associated with the second user identifier in the presence table; and
- upon update, at the computer, of the buddy list of the first user, including when a change of the display name of the second user in the buddy list of the first user is accepted, being notified of updated buddy list information of the first use; and
- acquiring updated buddy list information from the buddy list of the first user updated after a last connection time to the computer, and presence information of one or more buddies which are on the buddy list updated and of which presence information has changed after the last connection time.

17. A presence-referencing method used for a plurality of client devices operated by a first user and that connects with a computer that administrates the presence information by storing in a client table the first user identifier in association with identifiers of the plurality of client devices operated by the first user, the method comprising:
  storing in a buddy list, of the first user, a second user identifier and a display name for a second user named by the first user, in association with the first user identifier, where
    the second user identifier identifies a second user whose presence information is to be watched by the first user, and
    the display name corresponds to the second user identifier in the buddy list, wherein the computer that administers presence information stores in a presence table presence information in association with the second user identifier;
  upon update, at the computer, of the buddy list of the first user, including when a change of the display name of the second user in the buddy list of the first user is accepted, being notified, at the plurality of client devices for the first user in the client table, of updated buddy list information of the first user; and
  acquiring for the plurality of client devices for the first user, updated buddy list information from the buddy list of the first user updated after a last connection time to the computer, and presence information of one or more buddies which are on the buddy list updated and of which presence information has changed after the last connection time.

18. A method of synchronizing attribute information of buddies in a plurality of client devices operated by a first user in a networked messaging system, comprising:
  executing at a presence administration device:
    storing in a client table a first user identifier in association with identifiers of a plurality of client devices operated by the first user;
    storing in a buddy list, of the first user, a second user identifier and a display name for a second user named by the first user, in association with the first user identifier, where
      the second user identifier identifies a second user whose presence information is to be watched by the first user, and
      the display name corresponds to the second user identifier in the buddy list;
    storing in a watcher list of the first user, the first user identifier in association with the second user identifier from the buddy list; and
    synchronizing, according to a last connection time by a client device of the first user to the presence administration device, the plurality of client devices operated by the first user by transmitting updated presence information associated with the second user identifier in the presence table and updated buddy list information of the first user.

* * * * *